Sept. 15, 1959

B. J. THAMER ET AL 2,904,488

NUCLEAR REACTOR FUEL SYSTEMS

Filed June 6, 1956

WITNESSES:

INVENTORS
Burton J. Thamer
Richard M. Bidwell
R. Philip Hammond
BY

Sept. 15, 1959  B. J. THAMER ET AL  2,904,488
NUCLEAR REACTOR FUEL SYSTEMS
Filed June 6, 1956  8 Sheets-Sheet 2

WITNESSES:

INVENTORS
Burton J. Thamer
Richard M. Bidwell
R. Philip Hammond
BY

Sept. 15, 1959     B. J. THAMER ET AL     2,904,488

NUCLEAR REACTOR FUEL SYSTEMS

Filed June 6, 1956

INVENTORS
Burton J. Thamer
Richard M. Bidwell
R. Philip Hammond
BY

United States Patent Office 2,904,488
Patented Sept. 15, 1959

2,904,488

NUCLEAR REACTOR FUEL SYSTEMS

Burton J. Thamer, Richard M. Bidwell, and R. Philip Hammond, Los Alamos, N. Mex., assignors to the United States of America as represented by the United States Atomic Energy Commission Application June 6, 1956, Serial No. 589,835

3 Claims. (Cl. 204—193.2)

The present invention relates to nuclear reactor fuels and more particularly to liquid fuel solutions for homogeneous reactors.

The homogeneous reactors of the prior art generally employ aqueous solutions which result in numerous problems with the radiolytic dissociation of the water solvent-moderator. The solution to these problems has required extensive gas recombining apparatus or large venting installations to overcome the hazards of explosive radiolytic gases. Further, the operating temperatures of such reactors have generally been lower than 100° C. to prevent the boiling of the moderator thereby avoiding the creation of large volumes of steam and the resultant problems in condensing the steam or of venting the steam and adding water to keep the solution at the proper concentration.

A further limitation on the operating temperature of the prior art reactors has resulted from the instability of the uranium salts commonly utilized in the liquid fuel solution. Such water soluble neutral salts as uranium nitrate and uranium sulfate are unstable at operating temperatures above about 300° C., in the absence of excess acid, and therefore their use is limited to low operating temperature reactors.

The reactor fuel system of the present invention provides a liquid fuel for a nuclear reactor consisting of phosphoric acid and water solutions of enriched uranium, wherein the uranium is in either the hexavalent or tetravalent state. A reactor utilizing such a liquid fuel may require the use of gold or similar cladding or plating on all portions of the reactor system exposed to the liquid fuel. The solutions of the present invention are stable at sufficiently high temperatures so that at normal operating temperatures very little net radiolytic gas production will occur, i.e., there is automatic recombination of the radiolytic gases, thereby eliminating many of the problems associated with prior art reactors. Further, the uranium compounds of the present invention are neutronically stable at high temperatures.

The phosphoric acid system has the further advantage of exhibiting a large thermal expansion, a factor which increases the controllability of the reactor and eliminates the handling of the liquid fuel outside the reactor vessel except for recovery processes. This property of the liquid fuel provides a simple, safe means for controlling the reactor without the necessity of control rods except for complete shut-downs. Thus, the use of the liquid fuels of the present invention results in increased controllability and therefore safer operation.

An example of a reactor utilizing the liquid fuels of the present invention is described as particularly suitable for use in power generating facilities where a large power output, e.g., of the order of 20 megawatts, is required. The specific example has a power level of about 2 megawatts and has a neutron flux of the order of $1.3 \times 10^{13}$ neutrons/cm.$^2$/sec. using hydrogen from $H_2O$ and $H_3PO_4$ as moderator.

The reactor consists generally of a reactor vessel containing a heat exchanger, fuel circulating apparatus, and safety apparatus, and utilizes a liquid fuel solution of enriched uranium in phosphoric acid and water.

Therefore, it is an object of the present invention to provide a liquid fuel for a nuclear reactor.

It is a further object of the present invention to provide a homogeneous reactor liquid fuel which does not require apparatus to recombine gases formed from the radiolytic dissociation of water in the fuel.

It is a still further object of the present invention to provide a homogeneous reactor liquid fuel system which is thermally and neutronically stable at high temperatures and which exhibits the property of phase criticality under predetermined conditions.

It is a still further object of the present invention to provide a liquid fuel for a homogeneous nuclear reactor which consists of enriched uranium phosphate, phosphoric acid and water.

It is a still further object of the present invention to provide a method and means for stabilizing the uranium in solution in a liquid fuel consisting of uranium phosphate, phosphoric acid and water, by providing a reducing or oxidizing atmosphere of pressurized gas in the reactor.

These and other objects of the present invention will become more apparent from the following description including the drawings, hereby made a part of the specification, wherein.

SUMMARY OF REACTOR SPECIFICATIONS

| | |
|---|---|
| Type | Homogeneous. |
| Neutron energy | Thermal. |
| Power | 2 megawatts. |
| Fuel | About 90% enriched $UO_3$ dissolved in $H_3PO_4$. |
| Moderator | Hydrogen (from $H_2O$ and $H_3PO_4$). |
| Solution: | |
| Composition | .6 M $UO_3$ + 7.5 M $H_3PO_4$. |
| Power density | 46.5 kw./liter. |
| Specific power | 470 kw./kg. fissionable material. |
| Critical mass | 4.24 kg. |
| Total fissionable material | 9.2 kg. |
| Hot volume | 94 liters (430° C.). |
| Cold volume | 62 liters (20° C.). |
| Maximum operating temperature | 455° C. (850° F.). |
| Maximum operating pressure | 5000 p.s.i. |
| Gas evolution | Equal to recombination by back reaction. |
| Heat exchanger: | |
| Area | 38.5 sq. ft. |
| Average heat flux | 177,000 B.t.u./sq. ft./hr. |
| Coolant | Water. |
| Coolant velocity | Inlet 15 ft./sec. at 3900 p.s.i.; outlet 120 ft./sec. at 3600 p.s.i. |
| Coolant flow rate | 12 g.p.m. |
| Coolant temperature | In 38° C. Out 427° C. |
| Vessel: | |
| Over-all volume | 122 liters. |
| Vapor volume | 26.88 liters. |
| Storage volume and heat exchanger region | 48.39 liters. |
| Core or critical region | 15" dia. x 16" high cylinder, with a volume of 46.21 liters. |
| Over-all length | 8.25 feet. |
| Vessel and pump | 12.63 feet. |
| Composition | 3" wall stainless steel. |
| Control: Rods ($B^{10}$ density 1.7) | 4 safety, 1 control. |
| Shield: Composition | 4 ft. $H_2O$ + 10" Pb + 5.5 ft. concrete. |
| Fluxes in core: | |
| Fast neutrons (maximum, over .038 e.v.) | $1.4 \times 10^{14}$ n/cm.$^2$/sec. |
| Fast neutrons (average) | $9 \times 10^{13}$ n/cm.$^2$/sec. |
| Fast neutrons (inner vessel surface) | $7 \times 10^{13}$ n/cm.$^2$/sec. |
| Thermal neutrons (maximum) | $2.6 \times 10^{13}$ n/cm.$^2$/sec. |
| Thermal neutrons (average) | $1.3 \times 10^{13}$ n/cm.$^2$/sec. |
| Total gamma flux | $7 \times 10^{17}$ γ/sec. |

APPARATUS

Figure 1:
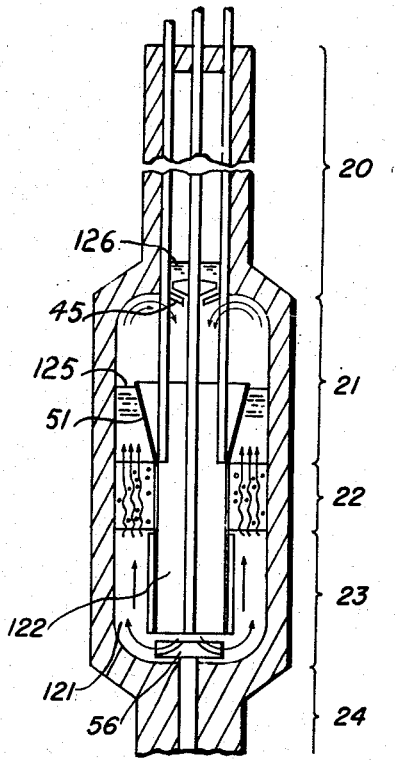
Figure 1 is a functional schematic view of a reactor helpful in explaining the operation of the reactor utilizing the liquid fuels of the present invention.

An example of a reactor in which the liquid fuels of the present invention may be used is shown in schematic form in Figure 1, and may be divided into five sections for the purpose of description, i.e., vapor region and manifold section 20, critical region 21, heat exchanger region 22, storage reservoir 23, and circulating apparatus section 24. These sections are shown in detail in Figure 2 of the accompanying drawings. Referring now to the detailed sectional view of Figure 2, the reactor consists of a pressure vessel 25, preferably fabricated from stainless steel, which has an upper flange 26 and a reduced diameter impeller section 27. The interior of the vessel has a diacritical diameter section 28, a reduced diameter section 29 which is less than the critical diameter and which extends from the top of the heat exchanger region 22 to the bottom of the storage reservoir 23, and a circulating pump aperture 30 at its lower extremity.

Attached and sealed to the upper vessel flange 26 is a coolant inlet manifold assembly 31. Connected to the inlet manifold assembly 31 is a plurality of heat exchanger lead pipes 32 which are sealed to the manifold 31 and which are connected to a source of water (not shown) through inlet water channel 33. A top plate assembly 34 is sealed to the inlet water manifold assembly 31, and to a spacer ring 35, by means of a plurality of bolts 36, or other well-known means. The top plate assembly 34 has a cross-section in the form of a T with a central aperture 37 and bottom plate 38 welded or otherwise sealed to lower portion 39 of the top plate assembly 34.

Fixed to the interior surface of bottom plate 38 and extending upwardly therethrough and through central aperture 37 is steam outlet manifold assembly 40. Terminating in the outlet manifold 40 are outlet lead pipes 41 of heat exchanger 52 which are sealed to the outlet manifold 40 and are connected to the steam utilizing systems (not shown) through outlet channel 42. The outlet channel 42 extends up through sleeve 43 which is connected in any conventional manner to the steam system. Supported within the sleeve 43 is a central control rod thimble 44 which is of considerably smaller outside diameter than the inside diameter of sleeve 43 and has its upper extremity welded to the inside surface of the sleeve 43 to provide a seal for the channel 42. The channel 42 is connected to the steam utilizing system through an aperture in the upper portion of sleeve 43. Control rod thimble 44 extends downwardly through sleeve 43, is welded or otherwise sealed to outlet manifold assembly 40, and extends to the bottom of storage reservoir 23.

The outlet and inlet manifold assemblies, as described above, are separated by a distance of about 18 inches so that gradual temperature gradients are possible, and so that the thermal stresses in the top plate assembly 34 and vessel flange 26 are reduced. It should also be noted that the main vessel seal through inlet manifold assembly 31 and spacer ring 35 is well above the critical region 21. The flange 26 may be water cooled by cooling jacket 46, as is the surface of the central aperture 37 by cooling jacket 47. The main vessel seal region is further cooled by the inlet manifold 31. In this manner, the activation of the seal region, which should not exceed a temperature of 50° C., will be low with about 18 inches of steel available to attenuate neutrons and gamma rays. Seal welds are provided although with the low temperatures existing in this region neoprene or metal O rings or similar sealing means may be used in the seal area. Channel 48 between the vessel 25 and the lower portion 39 of the top plate assembly 34 serves the dual purpose of separating the hot and cold manifolds and of providing a restricted region where vapor condensation may take place.

Additional or fewer safety rod thimbles 49 may be provided. These additional thimbles 49 are four in number, are symmetrically placed around the central control rod thimble 44 and extend only to the bottom of the critical region 21. Thimbles 49 are sealed to the bottom plate 38 and extend upwardly through the central aperture 37.

Supported by the central control rod thimble 44 is a liquid fuel flow directing baffle 45. The baffle is made heavy to decrease gamma ray heating of the cover, to serve as a poison for the vapor region, and to provide a narrow region above which the liquid fuel can rise without producing a change in criticality due to a volume change of the reactor core.

The central thimble 44 also supports a spider 50 which is attached to the bottom of thimbles 49. In this manner the upward thrust caused by the circulating liquid is distributed over all of the thimbles. The spider 50 is made up of several diametric supports which support a platinum funnel 51, heat exchanger 52, draft tube 53 and poison reservoir 54.

The platinum funnel 51 serves to guide the liquid fuel against the baffle 45 and to prevent vortexing of the liquid entering the draft tube 53. The funnel 51 is provided with openings to permit convection currents in the vessel during start-up and before the circulating pump is turned on.

The heat exchanger 52 consists of twenty-two similarly shaped, tightly wound spirals which are closely spaced, e.g., $\frac{1}{16}$ inch and staggered for maximum efficiency. The coils are made of $\frac{3}{16}$ inch O.D., $\frac{1}{8}$ I.D., stainless steel tubing which is clad with a few mils of gold. The heat exchanger is supported by inlet pipes 32 and outlet pipes 41. However, the spider 50 provides support against upward movement resulting from the forced circulation of the liquid fuel.

The draft tube 53 extends downwardly from the spider 50 through the heat exchanger 52 to the bottom of the storage reservoir 23. Attached to the draft tube 53 is a poison reservoir or can 54 which contains highly compressed sintered normal boron carbide, the purpose of which will be apparent hereinafter. Attached to the lower extremity of draft tube 53 is a flow directing element 55 which is shaped to give an efficient suction inlet and turn-around for the liquid fuel. The reactor vessel 25 is surrounded by a reflector (not shown) which consists of, in the preferred embodiment, four feet of water, which also serves as a neutron shield. It should be noted, however, that the reflector may be of any material known in art as a neutron reflector or the reflector may be absent if sufficient fissionable material is present.

Figure 3:
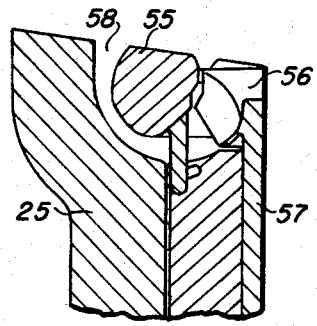
Figure 3 is a sectional view of a portion of the circulating pump utilized in the reactor of Figure 2.

Figure 3 shows a detailed cross sectional view of a portion of the circulating pump. The pump is of commercial design and therefore no detailed description of the pump assembly is included herein. Referring to Figure 3, an impeller 56 is attached to a shaft 57. The impeller 56 is designed to draw the liquid fuel down from the draft tube 53 into the area below the flow directing element 55 and force the liquid upwardly into channel 58. The pump is inserted through pump aperture 30. The motor is of the sealed rotor construction, designed to take up to 10,000 p.s.i. pressure. The bearings are of the liquid floating type. A small integral impeller circulates some of the fuel solution which serves as a lubricant and also cools the bearings. The stator is cooled by water circulating in the tubular electrical conductors. A labyrinth type seal is provided to reduce mixing between the hot radioactive liquid fuel in the vessel and the similar low temperature liquid flowing in the pump circulation system.

The critical region 21, heat exchanger region 22, and the storage reservoir 23 of the reactor vessel 25 are surrounded by a retort jacket assembly 60. The jacket assembly contains electrical heaters to minimize the temperature gradient in the vessel wall during start-up operations, insulation to minimize the temperature gradient between the vessel and the surrounding water shield during normal operation, and cooling coils to take care of additional gamma heating resulting from short, higher than normal power runs or errors in calculations.

The liquid fuels of the present invention do not require a storage reservoir. The expansion of the liquid fuel within a critical region may be utilized in filling the remaining percentage of the total volume to be filled.

For another example of a reactor utilizing the liquid fuels of the present invention, see copending application S.N. 589,836, filed June 6, 1956, entitled Convection Reactor. The reactor described herein is described in detail in copending application S.N. 589,837, filed June 6, 1956, entitled Homogeneous Nuclear Power Reactor.

LIQUID FUELS

Figure 4:
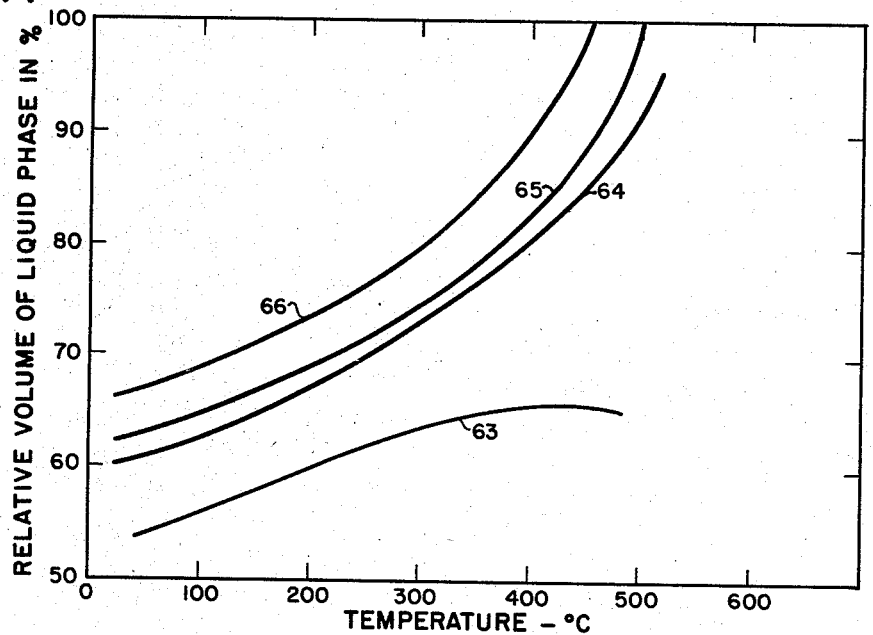
Figures 4 and 5 are graphs showing the temperature characteristics of one of the liquid fuel solutions of the present invention.

The liquid fuels of the present invention are solutions of enriched uranium phosphate in phosphoric acid and water. These solutions include uranyl phosphate and uranous phosphate in phosphoric acid and water, i.e., U(VI) and U(IV), respectively. The uranium is preferably enriched in the isotope $U^{235}$ to a value of about 90 percent, however, other enrichments may be utilized in the liquid fuels of the present invention, as well as the isotope $U^{233}$. The accompanying drawings, Figures 4 thru 12, illustrate some of the properties of these solutions. With particular reference to Figure 4, there is shown the dependence of the relative volume of the liquid phase in percent of the total volume of the vessel upon the temperature in degrees C for the solution of 0.491 M U(VI) as $UO_3$ in 7.5 M $H_3PO_4$.

The curve 63 at an initial filling of 52 percent shows that at increasing temperatures the relative volume of the vapor phase tends to level off, i.e., the liquid does not expand sufficiently to fill the entire volume of the vessel. However, this leveling off is dependent upon initial filling.

Curve 64 at an initial filling of 60.5 percent shows that the liquid expands with increasing temperature thereby filling a greater percentage of the total volume until at a temperature of about 525° C. the meniscus disappears. This phenomenon is interpreted to mean that at the critical temperature, i.e., the point where the meniscus disappears, the uranium becomes soluble in the gas phase in the upper portion of the container formerly occupied by vapor only. This amounts to a sudden dilution of the uranium at this transition and the reactor would become subcritical. Thus, for the particular solution and percent initial filling the maximum operating temperature could be built into the reactor, thereby controlling the reactor.

Curve 65 with an initial filling of 61.8 percent shows that for the particular solution the phase critical phenomenon is no longer present. Thus, such a solution filling could be utilized in a reactor where it was considered undesirable to have the phase critical phenomenon present in the reactor system.

Curve 66 shows the effect of a greater initial filling on the maximum operating temperature. As can be seen by comparing curves 65 and 66, the effect of an increase in initial filling in this range of about 5.2 percent decreases the temperature at which the entire volume is occupied by the liquid phase from about 500° C. to about 450° C. In this manner the maximum desired operating temperature can be built into the reactor by varying the initial filling.

Figure 5:
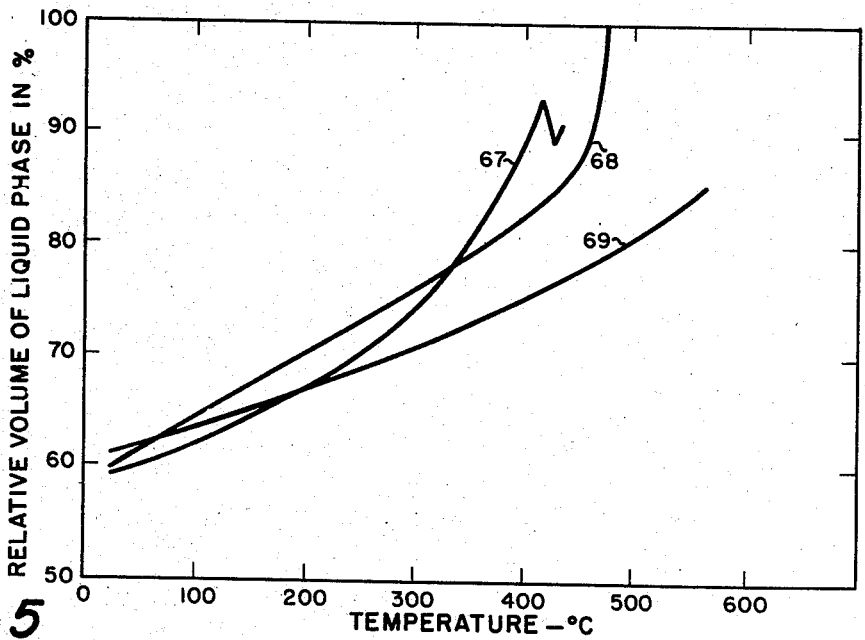

Figure 5 shows the effect of varying the concentration of phosphoric acid with approximately constant uranium concentration and initial degree of filling wherein the abscissa and ordinate are the same as Figure 4.

Curve 67, for a solution of 0.483 M U(VI) as $UO_3$ in 4.10 M $H_3PO_4$ with an initial filling of 59.3 percent, which is approximately equal to the filling for curve 64 of Figure 4, shows that the effect of a decrease in the concentration of phosphoric acid for approximately the same uranium concentration results in the phase critical phenomenon becoming more pronounced and appearing at a considerably lower temperature. This is due principally to the lower concentration of phosphoric acid.

Curve 68 for a solution of 0.462 M U(VI) as $UO_3$ in 5.61 M $H_3PO_4$ with an initial filling of 60.1 percent may be compared with curve 66 to show that a material increase in phosphoric acid concentration results in a system which has a relative volume of the liquid phase of 100 percent at about the same temperature as does a system with higher initial filling and greater concentration of uranium and phosphoric acid.

Curve 69 for a solution of 0.480 M U(VI) as $UO_3$ in 12.7 M $H_3PO_4$ at an initial filling of 60.3 percent, in comparison with curves 67 and 68, shows that the general effect of increasing the phosphoric acid concentration is to materially reduce the relative volume of the liquid phase at a given temperature and for a particular initial filling. Thus, the expansion of the solution is also related to the phosphoric acid concentration. Such a relation enables a determination of the percentage of the volume of the reactor which contains liquid fuel to be made by remote temperature indicating devices, if the composition and initial filling percentage is known.

Figure 6:
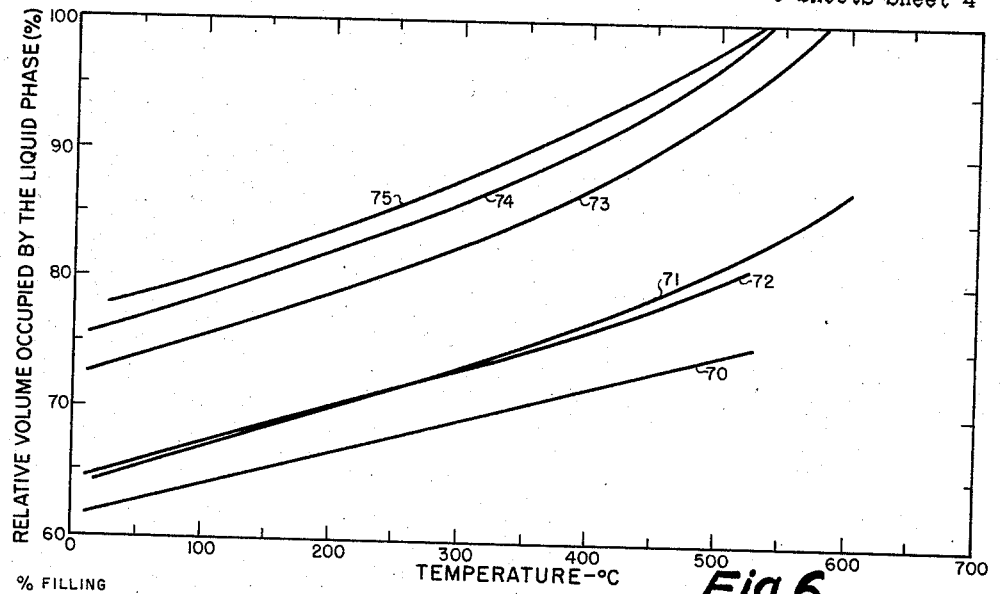
Figure 6 is a graph showing the temperature characteristics of the uranous phosphate liquid fuel solution.

Referring now to Figure 6, a series of curves is shown indicating the relation between temperature and the relative volume occupied by the liquid phase, in percent of the total volume for enriched uranium (IV) in the form of dissolved $UO_2$.

Curve 70, for a solution of 0.4 M U(IV) as $UO_2$ in 17.8 M $H_3PO_4$ with an initial filling of 62.2 percent, when compared to the uranyl solutions, shows that the uranous system exhibits the property that a higher phosphoric acid concentration materially reduces the expansion of the solution over the same temperature range.

Curve 71, for a solution of 0.40 M U(IV) as $UO_2$ in 14.1 M $H_3PO_4$ with an initial filling of 64.8 percent shows the same properties as curve 70 and has the same general curvature. However, in the case of curve 71 a hydrogen-oxygen recombination catalyst, copper, has been added in the form of 0.10 M Cu as $Cu_3(PO_4)_2 \cdot 3H_2O$.

Curve 72, for a solution of 0.364 M U(IV) as $UO_2$ in 16.3 M $H_3PO_4$, with an initial filling of 65.4 percent, follows the same general curvature as curve 70 except that in the higher temperature ranges the expansion is relatively larger.

Curve 73, for a solution of 0.40 M U(IV) as $UO_2$ in 14.1 M $H_3PO_4$ with an initial filling of 73.1 percent, shows that in the temperature range up to 600° C. this initial filling percentage of about 73 percent is about minimum if the liquid is to occupy the entire volume.

Curve 74 is for the same solution as curve 71, only the initial filling percentages being different. It should be noted that curve 73, for a solution without a recombination catalyst, and curves 71 and 74 have the same general curvature, and that no adverse effect on the expansion of the liquid results from the use of such recombination catalysts.

Curve 75 for a solution of 0.343 M U(IV) as $UO_2$ in 15.4 M $H_3PO_4$ with an initial filling of 78.1 percent has the same general properties as the solutions of curves 73 and 74.

Figure 7:
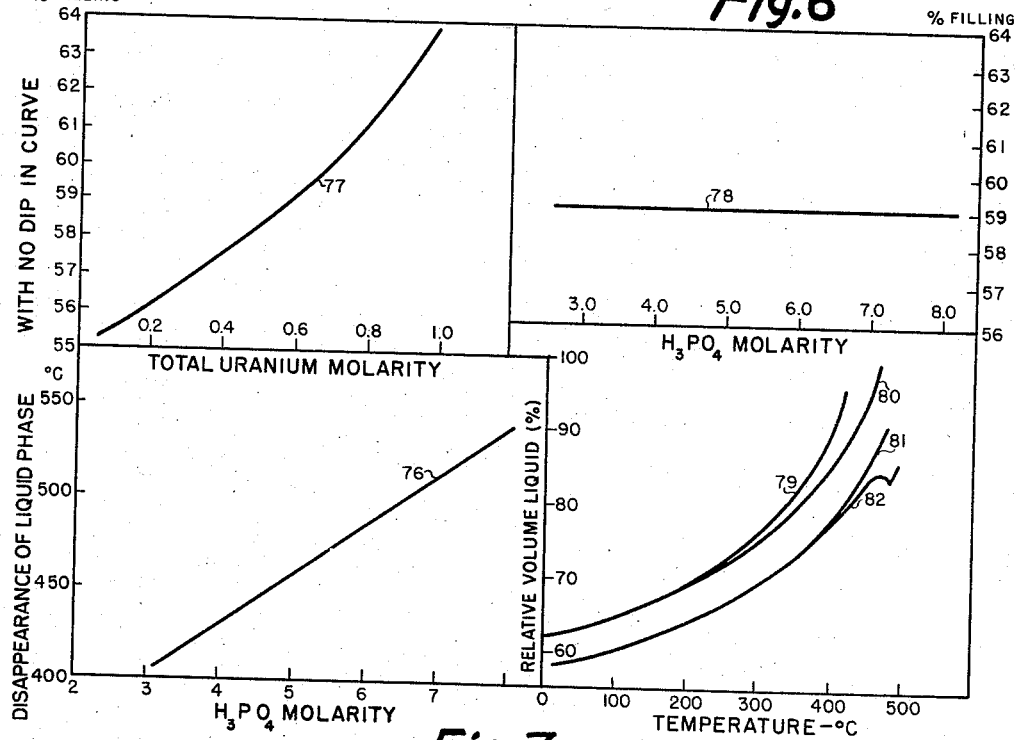
Figure 7 is a series of graphs showing additional properties of the uranyl phosphate liquid fuel solution.

Referring now to Figure 7, several graphs indicate additional properties of the uranyl system. Specifically, curve 76 shows the relation between phosphoric acid molarity and the temperature at which the meniscus disappears, i.e., the phase critical point temperature. This curve is for a constant uranium molarity of 0.48. Thus, the general increase in the phase critical point temperature with increasing phosphoric acid molarity is apparent.

Curve 77 shows the relation between total uranium molarity and the least percentage of filling required to avoid the maximum in the relative volume curve before the meniscus disappears. This curve is for a constant phosphoric acid molarity of 5.6. Points slightly above the curve can give the phase critical phenomenon without a maximum in the curve. Thus, for a reactor wherein the phase critical phenomenon is not to be utilized, the combinations of uranium molarity and percentage filling which are considerably above the curve must be utilized. Further, it is apparent that a minimum filling of 55 percent of the total volume is required to avoid the phase critical phenomenon with a maximum even with no uranium.

Curve 78 is related to curve 77 in that in the solutions of curve 78 the uranium molarity is held constant and the effect on the minimum percentage filling to avoid the no-maximum phase critical phenomenon of variations in the phosphoric acid molarity are shown. The critical filling required for a constant uranium molarity of 0.48 is approximately 59 percent. Thus, the phosphoric acid concentration does not appear to appreciably affect the existence of the phase critical point, although the temperature at which it takes place is affected. Similar curves for other uranium molarities can be worked out by skill-of-the-art techniques.

The series of curves 79 through 82 depict the relationship between temperature and relative volume of the liquid phase in percent for two specific solutions with (curves 80 and 82) and without (curves 79 and 81) the use of an atmosphere of gas over the solution. Referring in particular to curves 79 and 80 for a solution of 0.462 M $UO_3$ in 5.61 M $H_3PO_4$ and of 0.45 M $UO_3$ in 5.56 M $H_3PO_4$, respectively, and an initial filling of about 62 percent, it is seen that the solution of curve 80 reaches a higher temperature at 100 percent liquid volume than does the solution of curve 79. This change does not result merely from the minor changes in concentration, but is a result of the utilization of a 200 p.s.i. overpressure of oxygen over the solution of curve 80. This overpressure of oxygen is used to help prevent corrosion to the reactor vessel and also functions to keep the uranium in the preferred valence state during the operation of the reactor, as is explained in more detail hereinafter.

As can be seen by comparing curves 81 and 82, where curve 82 is for a solution having an overpressure of oxygen, the overpressure also increases the temperature at which the phase critical point phenomenon occurs, i.e., 479° C. for the solution of curve 81 and 491° C. for the solution of curve 82.

In the case of the uranous system, i.e., the tetravalent system, an overpressure of hydrogen is utilized which has the same general effect as oxygen does for the uranyl system, i.e., generally prevents corrosion and aids in maintaining the uranium in the proper valence state. This effect is described in detail hereinafter.

Figure 8:
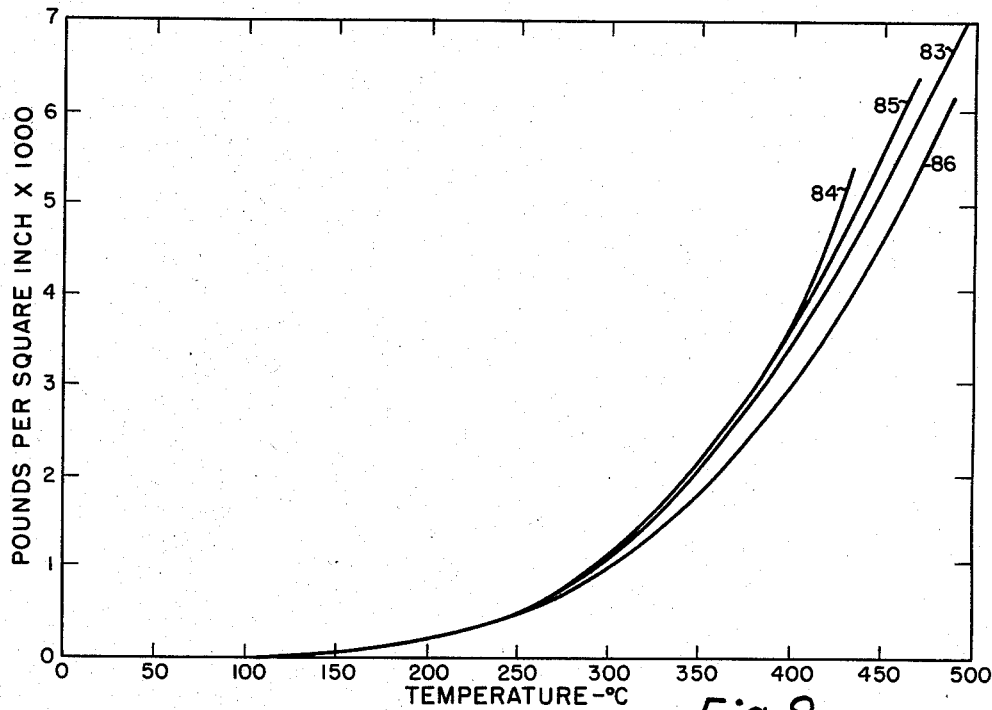
Figure 8 is a graph showing the dependency of vapor pressure on temperature for the uranyl phosphate system.

Figure 8 shows a series of curves for the uranyl system wherein the vapor pressure is plotted against temperature for various concentrations and percent initial fillings. Specifically, curve 83 is for a solution of 0.764 M $UO_3$ in 5.28 M $H_3PO_4$ and an initial filling of 51.6 percent; curve 84 is for a solution of 0.309 M $PO_3$ in 2.90 M $H_3PO_4$ with an initial filling of 58 percent; curve 85 is for a solution of 0.76 M $UO_3$ in 5.28 M $H_3PO_4$ with an initial filling of 58 percent; and curve 86 is for a solution of 0.75 M $UO_3$ in 7.50 M $H_3PO_4$ with an initial filling of 58 percent.

Comparing curves 83 and 85 it can be seen that for essentially the same solution the vapor pressure is related to the initial filling percentage. Comparing curves 84, 85 and 86, it is apparent that increases in the phosphoric acid concentration result in lower vapor pressures for a specific temperature. Thus, the higher the phosphoric acid concentration the lower the internal reactor pressure.

Therefore, it is desirable to obtain as high a concentration of phosphoric acid as is possible. As the $H_3PO_4$ concentration is increased, the relative volume curves become flatter, thus decreasing the negative temperature coefficient for a reactor, but also decreasing the control rod requirements. These considerations as well as the matter of vapor pressure make the concentration above 7.5 M $H_3PO_4$ more desirable for reactor use above 400° C., than the 3-4 M $H_2PO_4$, if corrosion is not a factor.

SOLUBILITY

With the uranyl system it is progressively more difficult to keep the uranium in the hexavalent state as the phosphoric acid concentration is increased. However, in the uranous system difficulty is encountered in keeping the uranium in solution at the lower concentrations of phosphoric acid.

Specifically, it has been found that above 0.6 M U(VI) as $UO_3$ is soluble in from about 3.0 M $H_3PO_4$ up to at least approximately 7.5 M $H_3PO_4$. However, in the uranous system, U(IV) as $UO_2$, with uranium of about 0.4 molarity, the uranium is soluble from 99.9 percent, effectively 100 percent, $H_2PO_4$, i.e., 18.0 M $H_3PO_4$, down to about 15.0 molar or 90 percent $H_3PO_4$. In the intermediate range of 7.5 to 15.0 M $H_3PO_4$ the properties of the solutions are similar except for the solubility of the particular valence state.

The present invention contemplates the use of phosphoric acids of low degree of hydration, such as $P_2O_5$, plus various amounts of water, resulting in phosphoric acids having compositions such as $HPO_3$, $H_4P_2O_7$, and $H_3PO_4$. These compositions have atomic ratios of hydrogen to phosphorus of from about 1:1 to approximately 60:1. Although only examples of the 60:1 (U(VI)) and 3:1 (U(IV)) ratios have been given, it is within the purview of the present invention to utilize atomic ratios as low as 1:1. The solutions having the atomic ratio of 1:1 have lower vapor pressures than the higher ratio systems. Further, the present invention contemplates the substitution of deuterium for hydrogen in the various compositions enumerated.

In general it may be stated the minimum phosphoric acid concentration is about two molar, and will depend upon the uranium molarity. The uranium molarity will depend upon the type and size of reactor, the presence of a reflector, type of reflector material, moderator, etc. However, from elementary theory, see Glasstone and Edlund, The Elements of Nuclear Reactor Theory, 1952, pages 222 et seq., the minimum uranium molarity may be calculated. Thus, for an ordinary water ($H_2O$) moderated reactor the uranium molarity would have to be at least about $10^{-2}$ while for a similar reactor utilizing heavy water ($D_2O$) as a moderator at least about $10^{-3}$ molarity would be required. Mixtures of heavy and normal water may also be utilized. Thus, the term water as used herein includes both normal and heavy water or mixtures thereof. These figures assume an enrichment of 100 percent $U^{235}$. However, for lesser enrichments the lower limits would be inversely proportional to the enrichment. The use of $U^{233}$ in place of $U^{235}$ is also contemplated by the present invention. The chemical characteristics of $U^{233}$ are the same. The nuclear characteristics would be changed in accordance with the knowledge of the art.

Examples of the solubility of the uranyl system ($UO_3$) are shown in Table 1 for nominally 2 and 3 molar phosphoric acid.

TABLE 1

| Temperature, °C. | Analytical molarities | |
|---|---|---|
| | U | Total phosphate |
| 25 | 0.34 | 2.00 |
| 161 | 0.257 | 1.90 |
| 199 | 0.224 | 1.91 |
| 267 | 0.203 | 1.88 |
| 298 | 0.198 | 1.95 |
| 354 | 0.308 | 2.43 |
| 380 | 0.592 | 2.97 |
| 25 | 0.62 | 3.00 |
| 200 | 0.559 | 3.12 |
| 250 | 0.601 | 3.40 |
| 291 | 0.561 | 3.29 |

Thus, it is apparent that uranium solubility increases with higher phosphoric acid concentration, the increase being attributable to the complexing action of the phosphoric acid.

Examples of the solubility of the system $UO_2$—$H_3PO_4$—$H_2O$ are shown in Table 2:

TABLE 2

| Temperature, °C. | Analytical molarities | | Solid phase |
|---|---|---|---|
| | U | Total phosphate | |
| 25 | 0.38 | 9.0 | U(HPO$_4$)$_2$·6H$_2$O. |
| 200 | 0.15 | 8.8 | B. |
| 430 | 0.11 | 9.3 | A. |
| 25 | 1.02 | 14.0 | U(HPO$_4$)(H$_2$PO$_4$)$_2$·H$_2$O. |
| 370 | 0.30 | 14.0 | C. |
| 430 | 0.24 | 14.0 | C. |
| 175 | 0.51 | 16.3 | C. |
| 250 | 0.67 | 16.5 | C. |
| 325 | 0.55 | 16.3 | C. |
| 370 | 0.46 | 16.6 | C. |
| 430 | 0.42 | 16.5 | C. |
| 490 | 0.44 | 16.6 | C. |
| 174 | 0.43 | 17.6 | B. |
| 250 | 0.48 | 17.6 | B. |
| 326 | 0.51 | 17.6 | B. |
| 430 | 0.48 | 17.6 | C. |
| 460 | 0.50 | 17.4 | C. |

The solid phase in each case was a uranous phosphate or pyrophosphate of which three forms were observed above room temperature. The three forms are: (A) $U(HPO_4)_2 \cdot H_2O$; (B) $U(HPO_4)(H_2PO_4)_2 \cdot 5H_2O$; (C) either $U(HPO_4)_2$ or $UP_2O_7$. Solid B appears to be the stable solid phase at the less elevated temperatures for concentrations of phosphoric acid of 9 molar and higher.

Table 3 contains the results of some measurements on the densities of solutions of $UO_3$ and $UO_2$ in $H_3PO_4$.

TABLE 3

| Solution composition (molarities) | Density, grams/ml. at 25° C. |
|---|---|
| 0.314 M UO$_3$ in 1.91 M H$_3$PO$_4$ | 1.1720 |
| 0.335 M UO$_3$ in 1.95 M H$_3$PO$_4$ | 1.1886 |
| 0.195 M UO$_3$ in 2.94 M H$_3$PO$_4$ | 1.1998 |
| 0.248 M UO$_3$ in 2.96 M H$_3$PO$_4$ | 1.2125 |
| 0.291 M UO$_3$ in 2.96 M H$_3$PO$_4$ | 1.2252 |
| 0.341 M UO$_3$ in 2.96 M H$_3$PO$_4$ | 1.2379 |
| 0.559 M UO$_3$ in 6.08 M H$_3$PO$_4$ | 1.4418 |
| 0.555 M UO$_3$ in 7.55 M H$_3$PO$_4$ | 1.5041 |
| 0.567 M UO$_3$ in 7.79 M H$_3$PO$_4$ | 1.5208 |
| 0.467 M UO$_3$ in 7.38 M H$_3$PO$_4$ | 1.4805 |
| 0.647 M UO$_3$ in 7.49 M H$_3$PO$_4$ | 1.5280 |
| 0.304 M UO$_2$ in 16.8 M H$_3$PO$_4$ | 1.8774 |
| 0.358 M UO$_2$ in 17.0 M H$_3$PO$_4$ | 1.8881 |
| 0.406 M UO$_2$ in 17.1 M H$_3$PO$_4$ | 1.9024 |
| 0.434 M UO$_2$ in 17.1 M H$_3$PO$_4$ | 1.9122 |
| 0.511 M UO$_2$ in 17.1 M H$_3$PO$_4$ | 1.9284 |

VAPOR PRESSURE

Figure 9:
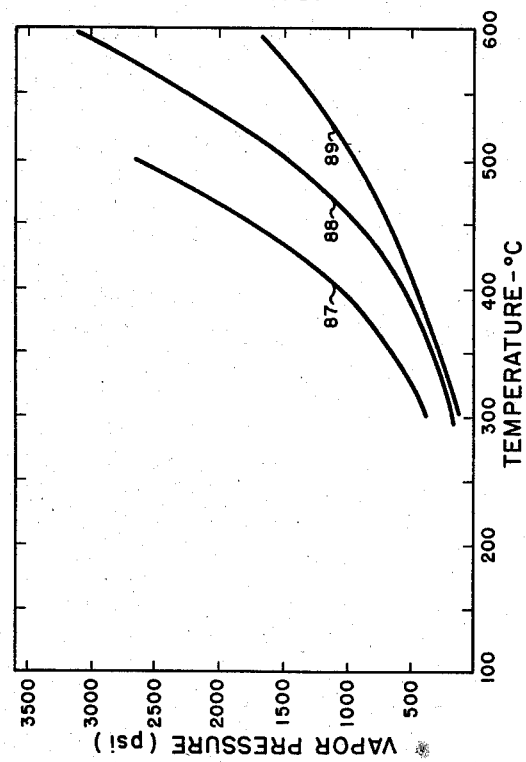
Figure 9 is a graph showing the dependency of vapor pressure on temperature for the uranous phosphate system.

The vapor pressure curves for the uranous system are shown in Figure 9. In this figure the vapor pressure is plotted as a function of temperature for 0.5 M U(IV) in the form of $UO_2$ with an initial filling of 62 percent. Curve 87 represents the variations in vapor pressure for an 85 percent concentration of phosphoric acid, i.e., 14.0 M $H_3PO_4$. Curve 88 is for a 95.7 percent concentration or 16.7 M $H_3PO_4$, and curve 89 is for a concentration of 100.7 percent or 18.3 M $H_3PO_4$. It is apparent from these three curves that increasing the phosphoric acid concentration lowers the vapor pressure at a given operating temperature.

Figure 10:
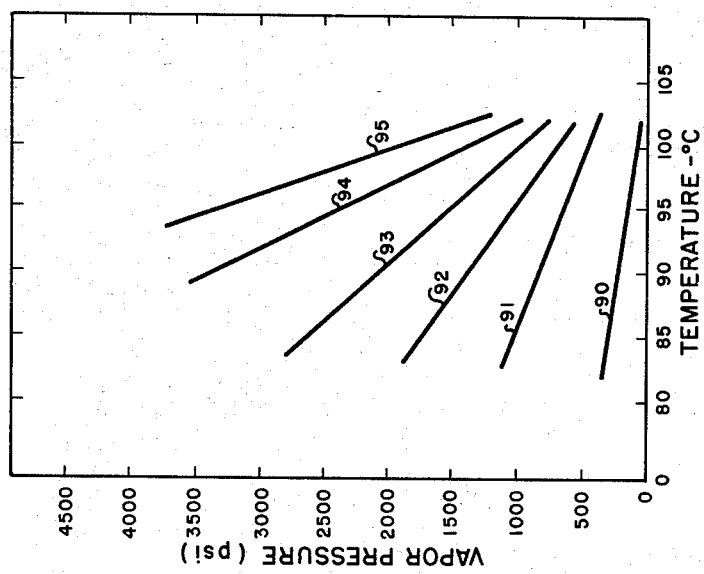
Figure 10 is a graph showing the variation in vapor pressure with percent phosphoric acid at different temperatures for the uranous phosphate system.

The series of curves in Figure 10 are similar to those of Figure 9 except that the temperature is held constant for each curve and the concentration of phosphoric acid is varied.

Curves 90 through 95 are for solutions of 0.5 M U(IV) in the form $UO_2$ with initial fillings in all cases of 62 percent and for temperatures 300°, 400°, 450°, 500°, 550°, and 600° C., respectively. It is apparent from the series of curves that increasing phosphoric acid concentration has a greater effect in reducing the vapor pressure of the solution as the temperature is increased.

Figure 11:
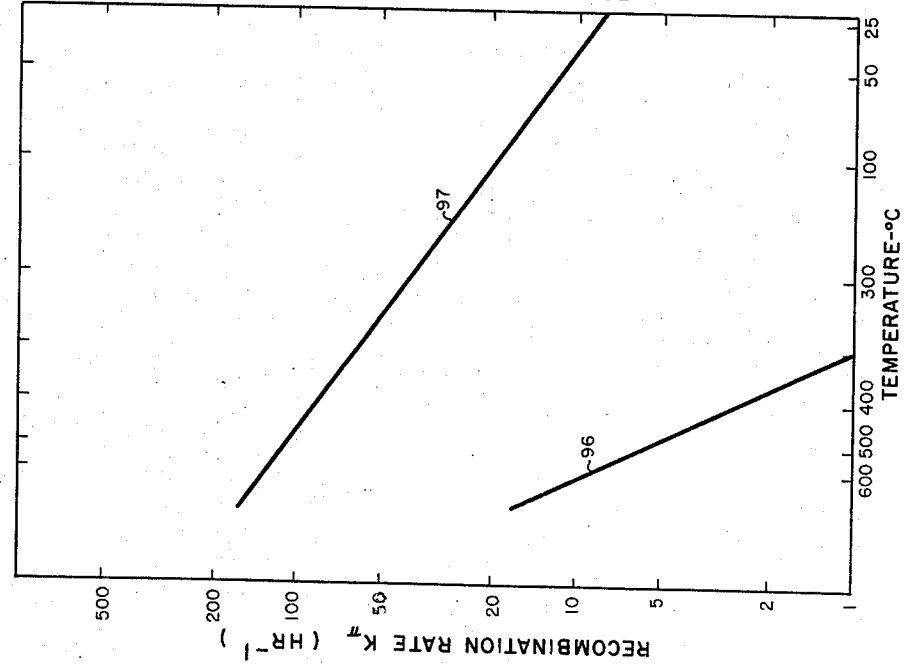
Figure 11 is a graph comparing the recombination rates of the radiolytic gases as a function of temperature for the uranyl and uranous phosphate system.

As was pointed out hereinbefore, one of the outstanding advantages of the enriched uranium-phosphoric acid and water systems is that there is little net radiolytic gas production, i.e., the gases are recombined without the necessity for conventional catalytic recombining apparatus. Figure 11 shows a plot of the recombination rate constants $k_\pi$ as a function of temperature for the uranyl and uranous systems. The recombination rate constant is defined as the fractional recombination per hour. Curve 96 is for a solution of 0.5 M U(VI) in 2.9 M $H_3PO_4$ but curve 97 is for a solution of 0.5 M U(IV) in 95.7 percent or 16.7 M $H_3PO_4$. It can be seen that for the dilute phosphoric acid solution, curve 96, the recombination rate is a rapidly varying function of temperature, while for the concentrated phosphoric acid solution, curve 97, this variation is not as rapid. Furthermore, the dilute solution requires a minimum operating temperature of about 300° C. before the recombination rate is sufficient at one megawatt of power. However, in the concentrated phosphoric acid solutions the recombination rate is considerable, even as low as room temperature.

Figure 12:
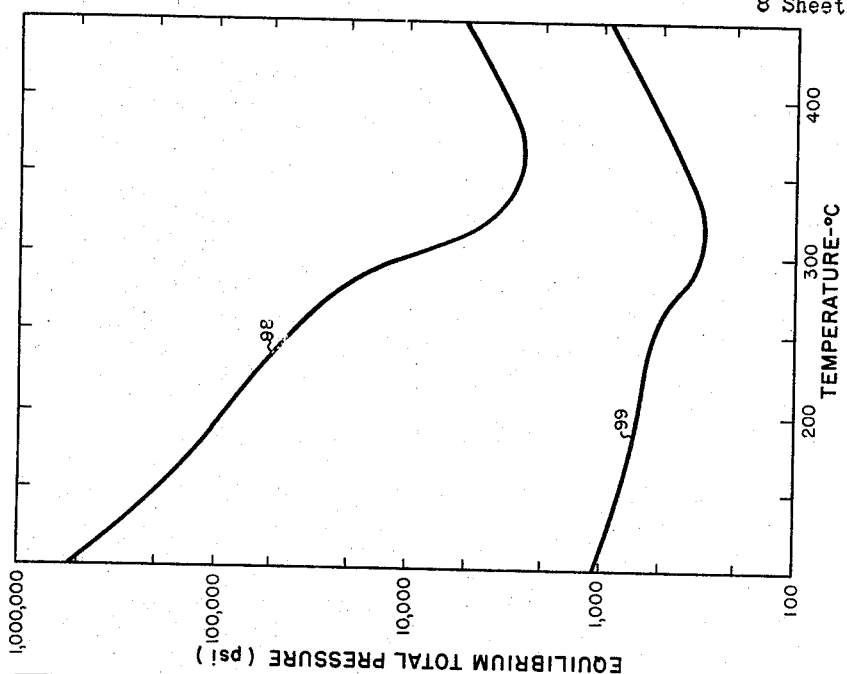
Figure 12 is a graph comparing the total pressure at equilibrium as a function of temperature for the uranyl and uranous phosphate system.

However, the recombination rate is dependent upon pressure, i.e., a certain equilibrium pressure must be reached before the recombination of gas is equal to the production. Figure 12 shows the variation of equilibrium total pressure with increasing temperature. Curve 98 shows the comparative variation in equilibrium pressure for the uranyl system, i.e., dilute phosphoric acid solutions, specifically, 0.5 M $UO_3$ in 7.5 M $H_3PO_4$, and curve 99 shows this variation for the concentrated solutions, specifically, 0.5 M $UO_2$ in 17.7 M $H_3PO_4$, for a power level of one megawatt.

Figure 13:
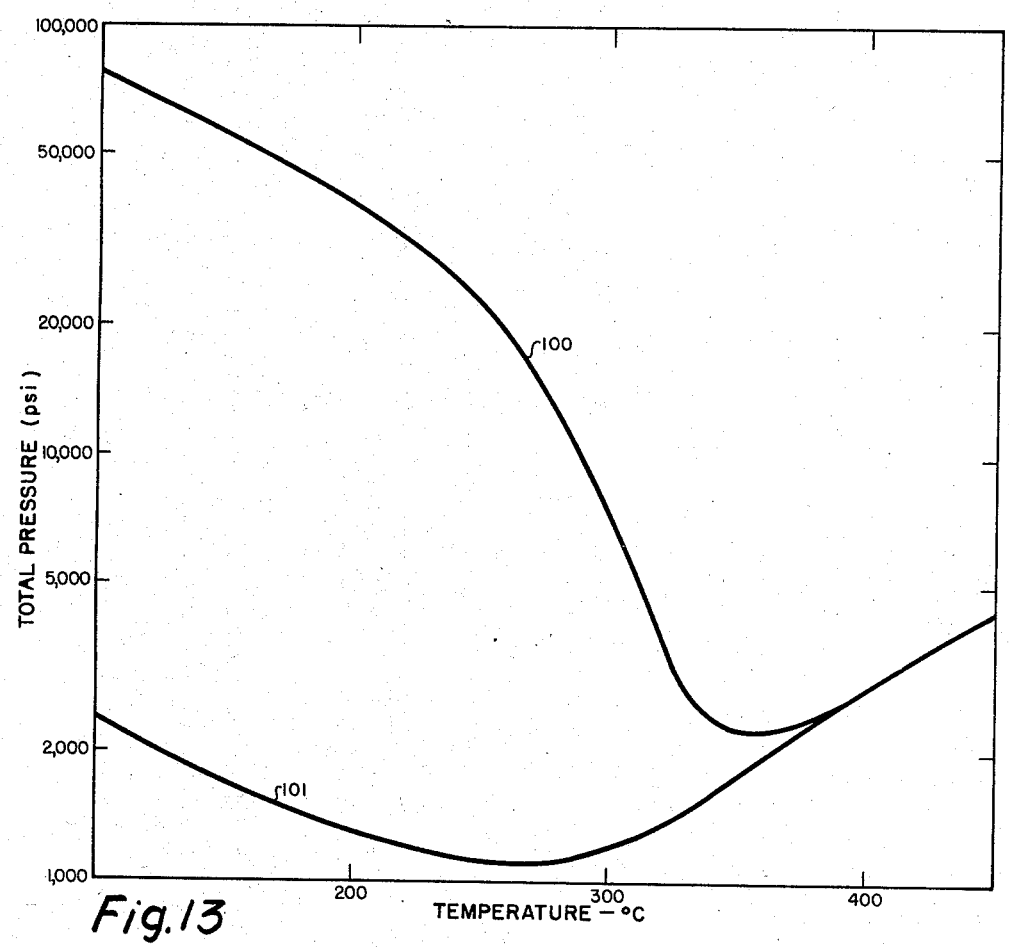
Figure 13 is a graph representative of the total pressures at given power levels.

Figure 13 shows the variation of total pressure in the reactor as a function of temperature for a solution of 0.5 M $UO_3$ in 7.5 M $H_3PO_4$ with 0.001 M Cu added. Curve 100 represents the total pressure at a power level of 1 megawatt while curve 101 is for a power level of 30 kw. It is apparent that at temperatures at or above 400° C. the total pressure in the reactor vessel for the two power levels is about the same. As evident from Figure 12, the uranyl system would have higher total pressures.

CORROSION PROTECTION

Uranyl

Corrosion tests up to 50° C. on Type 347, i.e., 17/19% Cr, 9/12% Ni, 0.08% C max., Nb 10×C min. stainless steel with 0.6 M $UO_3$ in 7.5 M $H_3PO_4$ showed insignificant corrosion (0.01 mil/year). The corrosion rate increases with increasing temperature up to about 200° C., the increase resulting from the increased rate at which the protective oxide coating is dissolved away. Above this temperature the corrosion rate decreases due to the formation of an adherent phosphate coating that impedes corrosion. However, in the tests with 7.5 M phosphoric acid there was pitting at temperatures corresponding to the corrosion minimum. In general, it was found that the higher the oxygen overpressure the lower the corrosion rate. The oxygen helps in maintaining a protective coating. Zirconium and certain zirconium alloys such as Zr-1.7% Mo appeared to be significantly better than 347 stainless steel.

Either gold or platinum has been found to have a satisfactorily low corrosion rate at 430° C. or below. For example, gold at 430° C. in contact with a solution of 0.6 M $UO_3$ in 7.5 M $H_3PO_4$ and 200 p.s.i. (25° C.) of oxygen gave a corrosion rate of 0.1 mil/year or less.

Corrosion tests similar to the one with gold showed that corrosion rates of 0.1 mil/year or less were undergone by alloys such as 90% Pt–10% Ir, 90% Pt–10% Ru, 90 Pt–10% Rh, and 30% Pt–70% Au. Because of the partial conversion of gold to mercury that would take place in a reactor, similar tests were made with Hg-Au alloys. An alloy of 1% Hg–99% Au lost 90 percent of its mercury to the solution in two days. Thus, no appreciable concentration of mercury is built up in the gold under these conditions.

Uranous

Gold and platinum are the only two metals that have been demonstrated to be completely corrosion resistant above 400° C. to solutions of $UO_2$ in concentrated phosphoric acid.

The results obtained with gold were obtained at 430° C. with a solution of 0.4 M $UO_2$ dissolved in 16.5 M $H_3PO_4$. Corrosion rates of the order of the accuracy of detection (0.03 mil/year) or less were observed whether the gas phase above the solution was initially charged with air at one atmosphere or 200 p.s.i. of hydrogen.

Silver and copper have some corrosion resistance to concentrated phosphoric acid solutions if a neutral or reducing atmosphere is maintained. Hence, a little phosphorus acid $H_3PO_3$ may be incorporated in the solutions to ensure the presence of a reducing atmosphere. The $H_3PO_3$ reacts at elevated temperatures with the oxygen of the air as well as with any hexavalent uranium that is present with the dissolved $UO_2$. The excess $H_3PO_3$ then decomposes to phosphoric acid, phosphorus, and hydrogen.

Gold plating had a beneficial effect on the corrosion of silver or copper, but the effect of diffusion into the gold was excessive in the case of copper. Table 4 gives representative results at 430° C. for a test period of 25 days and for 14.5 M $H_3PO_4$ plus 0.20 M $H_3PO_3$. Subsequent tests with plated specimens were made with plated silver. It had been shown that the presence of a stick of graphite in the liquid fuel in the form of a cladding on some of the internal components, for example, exerted a protective action as did also the presence of an appreciable pressure of hydrogen. Although these effects were very marked with bare silver, they were ineffective in protecting silver within pinholes that had been drilled through gold plate which had been applied on silver.

Table 4

| Specimen | Av. penetration rate (mils/year) of silver or copper | Appearance of corroded specimen |
|---|---|---|
| 3 mils gold plate on silver | 0.08 | Unchanged except for a faintly lighter color of the gold. |
| 1 mil gold plate on copper | 40 ½ | Copper-colored surface with eruptions through plate and corrosion beneath plate. |

Corrosion tests with silver and 200 p.s.i of hydrogen, with pinholes of 5 mils diameter drilled into the bare silver surface, indicated that the corrosion rate within the pinholes appeared to be no greater than on the surface and that rate was about 10 mils per year.

The corrosion of bare silver at 430° C. in the presence of 200 p.s.i. (25° C.) of hydrogen is not affected appreciably by variations in the phosphoric acid concentration in the range 9–17.6 M. The introduction of 0.4 M dissolved $UO_2$ does not influence the corrosion rate at 350° C., but it has been observed to increase the corrosion rate threefold at 430° C.

SOLUTION STABILITY

If a solution of $UO_3$ in concentrated $H_3PO_4$ is heated with an air atmosphere in a closed container, it can be observed that at temperatures of 200° C. and higher the uranium spontaneously evolves oxygen and is converted to the tetravalent state. The decomposition also is appreciable after a period of several months at room temperature. The decomposition is more rapid and more extensive the higher the phosphoric acid concentration. Such decomposition may be prevented by having an overpressure of oxygen. Tests at 430°, 300°, and 170° C. of several hundred hours duration at each temperature have shown the thermal stability of a solution of 0.60 M $UO_3$ in 7.50 M $H_3PO_4$ over which had been placed 200 p.s.i. of oxygen at room temperature. The tests also indicated that the uranium was completely soluble in the latter solution.

The radiation stability of the liquid fuels is shown by the irradiation of a solution of 0.31 M $UO_3$ dissolved in 2.9 M $H_3PO_4$ in a thermal neutron flux of $1.5 \times 10^{13}$ for ten hours at temperatures from 260° to 390° C. A concentration of 0.002 M $Cu^{+2}$ also was present in the solution as a catalyst for the recombination of hydrogen and oxygen. The solution initially occupied 41% of the volume of its container. The power density developed in the solution was 60 kilowatts per liter. The solution appeared to be stable under these conditions although a moderate corrosion of the stainless steel bomb caused some reduction of uranium and copper. This stability extends to higher concentrations and temperatures. A solution of 0.5 M $UO_2$ in 16.5 M $H_3PO_4$ exposed at 430° C. to a thermal neutron flux of $10^{13}$ results in an equilibrium pressure of radiolytic hydrogen and oxygen of less than 20 p.s.i.

The pressure of radiolytically produced hydrogen and oxygen at 60 kw./l. is small compared with the vapor pressure of the solution at 430° C. This is true even in the absence of dissolved copper. The equilibrium radiolytic gas pressure is inversely proportional to an experimental recombination rate constant $k\pi$, which is the fractional recombination per hour. The value of $k\pi$ for the above solution with the 0.002 M $Cu^{+2}$ was four times as large as it would have been without the dissolved copper.

The fact that solutions of $UO_3$ in concentrated phosphoric acid spontaneously evolve oxygen to give uranous ion testifies to the great thermodynamic stability of the tetravalent state in such solutions. Hence, solutions of $UO_2$ would be expected to be stable in reducing inert, or moderately oxidizing atmospheres.

Thus, it is apparent that the liquid fuels of the present invention have the following characteristics:

(1) The expansion of the solution is dependent upon the percentage of the total vessel volume which is initially filled with the solution.

(2) A certain minimum initial filling is required in order to obtain 100 percent of the volume to be occupied by the liquid phase.

(2) Certain concentrations and initial filling percentages exhibit a phase critical phenomenon.

(4) The general effect of increased initial filling is to reduce the temperature at which the entire volume is occupied by the liquid phase.

(5) Decreases in phosphoric acid concentration generally move the point of 100 percent liquid volume to a lower temperature. The expansion of the solution is therefore related to the phosphoric acid concentration for a given temperature range, i.e., higher phosphoric acid concentrations reduce the solution expansion.

(6) The presence of a recombination catalyst does not materially affect the thermal properties of the solutions.

(7) Increasing the phosphoric acid concentration increases the temperature at which the phase critical point is exhibited.

(8) There is a minimum and maximum percentage initial filling between which the phase critical phenomenon will take place for any solution.

(9) The phase critical point is related to uranium molarity, phosphoric acid molarity and percent initial filling.

(10) The vapor pressure is related to the percent of initial filling and to the concentration of phosphoric acid. The higher the phosphoric acid concentration the lower the vapor pressure.

(11) The gas recombination rate for the U(IV) system is materially greater than the U(VI) system.

Thus, the selection of a liquid fuel for a particular reactor will require the selection of the uranium concentration, the phosphoric acid concentration, the initial filling percentage, the desired operating vapor pressure, the operating temperature, the recombination rate, and whether it is desirable to operate in the phase critical region.

For example, if the phase critical phenomenon is not to be utilized and an operating temperature of 450° C. is desired, the solution of curve 65 may be utilized. This particular solution requires an initial filling of 61.8 percent of the total volume to be occupied by the liquid fuel. The phase critical phenomenon is avoided since the initial filling is appreciably greater than 59 percent as indicated by curve 78 of Figure 7, and for a uranium molarity of 0.491 the initial filling is considerably above curve 77. The vapor pressure for this solution at 450° C. would be similar to curve 86 of Figure 8, and the recombination rate constant, see Figure 11, would be approximately 4 with a total vapor pressure at one megawatt of 5000 p.s.i. If a lower vapor pressure is desired, then the uranous, U(IV), system may be utilized which may require a higher phosphoric acid molarity.

Figure 14:
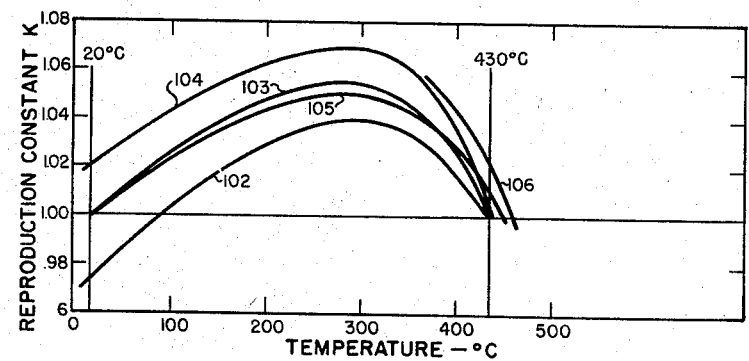
Figure 14 is a graph showing the dependency of the reproduction constant on reactor temperature for the reactor of Figure 2.

The effect on the reproduction factor $k\pi$ on reactor temperature and initial filling is shown in Figure 14. Curves 102, 103, and 104 show respectively the temperature dependence for solutions of 0.6 M $UO_3$ in 5.6 M $H_3PO_4$ in a cylindrical critical region 15″ diameter and 15″ high, for initial fillings of 58, 59 and 60 percent, respectively. The dotted curve 105 is for the 59 percent initial filling but shows the slight correction resulting from the expansion of the vessel. Curve 106 is for 60 percent initial degree of filling but shows the reflector effect of the baffle 45. It is apparent from Figure 14 that at about 430° C. the reproduction constant is 1.00. It should be noted that over the temperature range of from room temperature to about 300° C. there is a positive temperature coefficient of reactivity while beyond this point the coefficient becomes negative. Thus, sufficient control rods should be present so that an equivalent of at least about .08 $k$ can be inserted in cases of emergency shut downs.

CRITICAL REGION

The critical region is that region of a reactor vessel in which occurs the maximum concentration of neutron flux and in the reactor of the present invention lies between two noncritical regions, a vapor region above and a heat exchanger region below. Both of these latter regions, as well as the storage reservoir below the heat exchanger region, are maintained subcritical by poison and poor geometry. The volume of the storage reservoir and heat exchanger region, together with the cold critical volume of the critical region, is such that the expansion of the solution at the elevated operating temperature fills the reactor critical region and makes a critical assembly. Thus, a portion of the critical region is filled initially. The portion filled is determined by the percentage initial filling which in turn is dependent on various factors as described hereinbefore. For a particular filling, 59 percent for example, the liquid level would be in the lower portion of the critical region 21.

The quantity of fuel inserted in the initial filling is referred to herein as the cold-critical volume, that is, when the liquid fuel level is in the lower portion of critical region 21 as shown by the numeral 125 in Fig. 1. Thus, when the cold-critical volume of fuel is introduced into the reactor vessel the storage reservoir 23 and heat exchanger region 22 are completely filled with liquid fuel while the critical region 21 is only partially filled. As the cold-critical volume of fuel is heated by nuclear reaction, as explained hereinafter, the liquid fuel expands until the critical region 21 is completely filled, the fuel level being indicated by numeral 126 in Fig. 1. This increased volume of fuel is called the hot-critical volume of fuel. The reactor, when containing the hot-critical volume of fuel, is considered then to be hot-critical, a critical assembly having been created.

The critical region for the preferred embodiment of the present invention is a right circular cylinder having a 15″ diameter and a 16″ height. The necessary conditions for criticality may be calculated by methods well known in the art with consideration being given to the particular factors described above in the section "Liquid fuel system."

FUEL HANDLING SYSTEM

Figure 15:
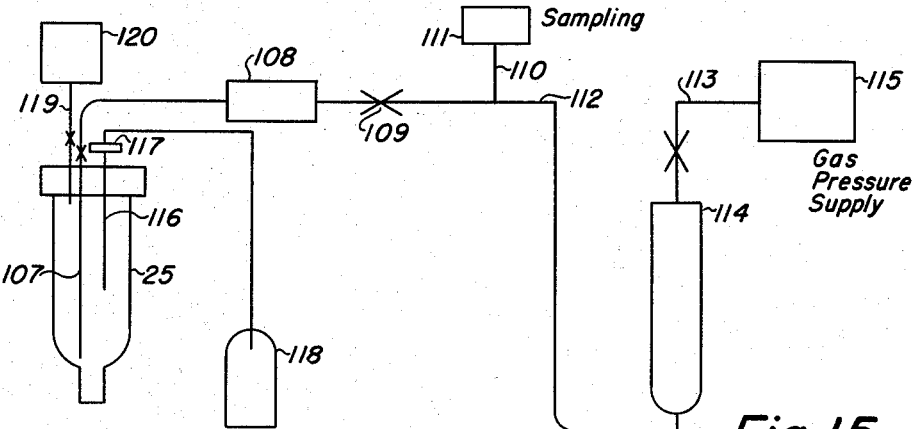
Figure 15 is a schematic diagram of the liquid fuel handling system.

The liquid fuel handling facilities are shown schematically in Figure 15. The vessel 25 has a solution transfer line 107 extending to the bottom of the storage reservoir. Transfer line 107 is connected through a water cooling jacket 108 and a valve 109 to sampling line 110, which is connected to conventional sampling apparatus 111, and to pipe 112. The pipe 112 is connected to the bottom of metering, non-critical reservoir tank 114. The liquid level in the metering tank 114 indicates the level of the liquid fuel in the reactor vessel. The maximum solution removal rate, with the reactor at full pressure, is 6 liters/min. since transfer lines 107 and pipe 112 are ¼ I.D. pipe. This removal rate permits cooling of the soup by cooling jacket 108 from the fuel operating temperature of about 450° C. to less than 100° C. In this manner the corrosive effect on the apparatus beyond the cooling jacket 108 is materially reduced and there is no need for precious metal cladding or plating to protect the pipes, valves, pump, and other components.

Connected to the top of metering tank 114 is a pressure line 113 connected to a gas pressure supply 115. Pressure from supply 115 forces the liquid fuel into the reactor vessel 25.

An emergency dump line 116 is provided and extends into reactor vessel 25 to the level of the heat exchanger, i.e., below the level of the critical region. A rupture disk 117 is provided in line 116 which is set to release the solution when the vessel pressure reaches 7500 p.s.i. The release of rupture disk 117 permits the liquid fuel to flow out of the reactor to an emergency dump tank 118, which is of a non-critical geometry and is located in a shielded, remote place. The air in the vessel is replaced with an overpressure of the desired gas through gas tube 119 which is connected to a system 120 which includes a vacuum pump and a source of the desired gas.

All components of the liquid fuel handling facilities are chosen to provide an ever-safe geometry for the liquid fuel.

SAFETY CIRCUITS

Figure 2:
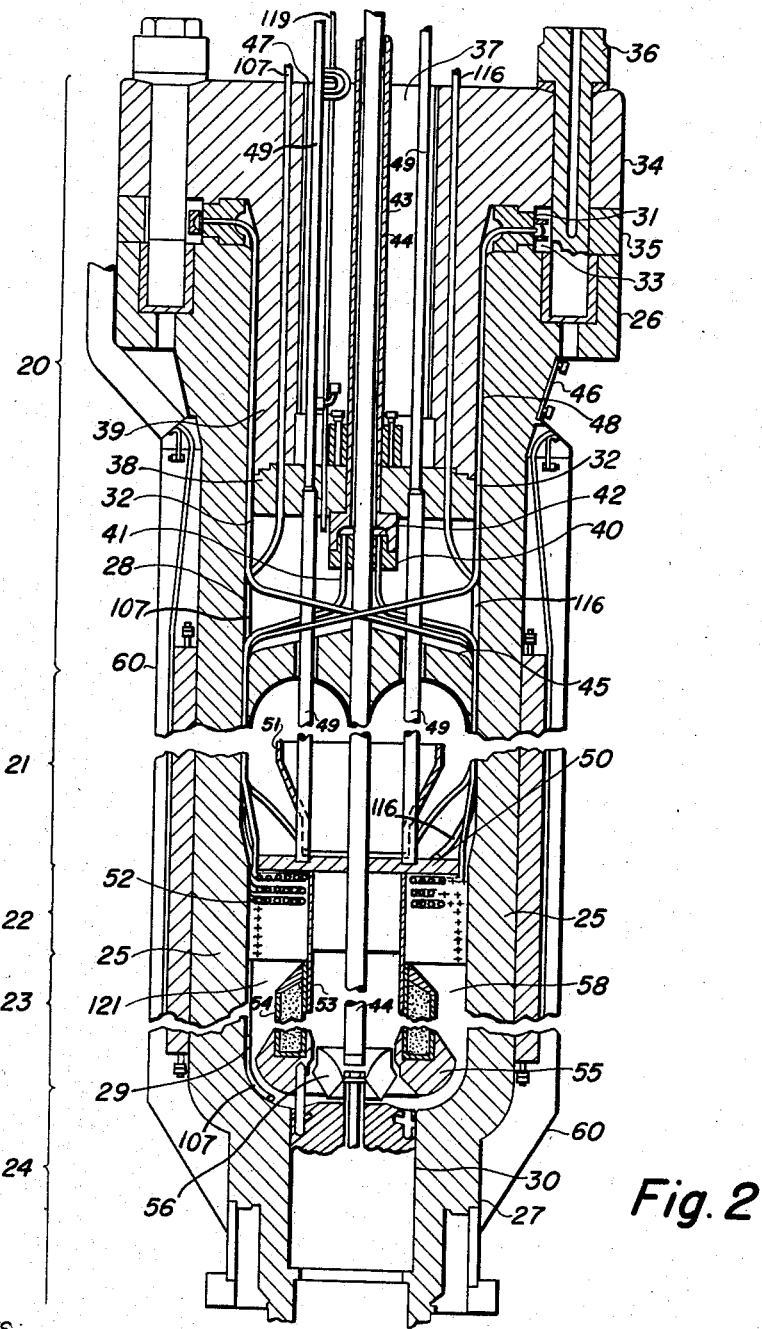
Figure 2 is a detailed drawing of a reactor utilizing the liquid fuels of the present invention.

The control rod and the safety rods are enriched boron rods which move inside the platinum-clad heavy walled stainless steel thimbles 44 and 49, respectively, as shown in Figure 2. The safety rods are about one-half inch in diameter and extend through the critical region only. The central or control rod is about 0.75 inch in diameter. The region of thimble 44 which lies below the heat exchanger serves as a container for part of the reservoir region poison. This poison, although removable, is not connected to that portion of the control rod which is movable into and out of the critical region.

The control rod mechanisms and safety circuits are similar to those of the prior art, see Principles of Nuclear Reactor Engineering, Samuel Glasstone, chapter VI (D. Van Nostrand & Co., 1955). In general, the control rods are moved in their vertical thimbles by two-phase, two-pole induction motors. The motors are controlled by level switches. The rods are attached to the withdrawing mechanism through D.-C. lifting magnets which are de-energized during a "scram" to allow the rods to fall freely into the reactor under the acceleration of gravity. Each rod hanger actuates a limit switch in the full-in and full-out position, this information being displayed on a control console.

Any leaks in the reactor vessel, abnormally high pressure in the steam line, power failure, excessive solution temperature, circulating pump leak, or failure of the feedwater pump, will automatically result in all safety and control rods being released.

The above described components and circuits are well known in the art and are therefore not illustrated in the drawings.

FUEL CIRCULATION

The liquid fuel circulation cycle for the illustrated reactor is shown in Fig. 1. In general, the fuel is circulated by the impeller 56 upwardly into channel 121 extending between the walls of vessel 25 and the outer surface of funnel 51, through the heat exchanger region 22, the critical region 21, and onto the flow directing surface of baffle 45 where the direction of flow is reversed, the fuel then flowing downwardly through channel 122 defined by funnel 51, where it is again agitated by impeller 56.

A significant contribution to the criticality of the reactor is made by the liquid fuel as it circulates through the diacritical diameter section 28 of the reactor vessel. The boron in poison reservoir 54 absorbs a portion of the emitted neutrons from the fuel circulating through the reduced diameter section 29 of the reactor vessel, thereby reducing the reproduction factor to a value below unity. In addition, the reduced diameter of section 29 also contributes to the reduction of the reproduction factor in that section.

At normal operating temperatures, about 450° C. for the illustrative example, there is no temperature differential between the liquid fuel in the storage reservoir and the liquid fuel in the critical region. Thus, the liquid fuel may be circulated in a direction opposite to that shown in Figure 1, if this is desirable and the circulating pump is changed.

Circulation of the liquid fuel reduces the number of delayed neutrons which are emitted in the critical region. For a circulation rate which changes the solution in the critical region twice a second, the reactivity difference between delayed and prompt critical is approximately 51 percent as large as it is without circulation. Thus, the reproduction constant is reduced approximately 0.4 percent by virtue of the removal of the delayed neutrons from the hot critical region by the circulating apparatus.

OPERATION

The start-up operation of the reactor of the present invention is as follows: The reactor vessel is evacuated by system 120 and the overpressure gas is admitted to the vessel, i.e., oxygen or hydrogen, so that at operating pressure the proper overpressure, i.e., 200 p.s.i. will be present. Valve 109 is opened. Gas pressure, 150 p.s.i. of oxygen, flows from source 115 through line 113 into reservoir 114 thereby forcing the liquid fuel through transfer line 107 into the reactor vessel at a rate of about one liter per minute. The amount of solution transferred to vessel 25 depends upon the percentage initial filling required for the particular liquid fuel and operating conditions. The amount required for any particular solution, i.e., the initial filling percentage, has been defined as the cold-critical volume. During the liquid fuel addition at least some of the control rods and/or safety rods are in their out position so that shut-down can be affected if the counting rates are too high or if the reactor should suddenly go critical. For the particular liquid fuel being used, cold-critical, with the remaining rods in, should be reached when the liquid fuel reaches a level about 8 inches above the heat exchanger. All valves to the reactor are closed.

As the remaining rods are removed the core region of the vessel becomes super-critical. The liquid fuel in the core will be heated by the nuclear reaction. The remainder of the liquid fuel will be heated to a uniform temperature by convection circulation. As the liquid fuel in the entire vessel heats it will expand to its hot-critical volume, thereby filling the entire critical region. As the fuel level rises from its initial position 125, as shown in Fig. 1, which is the liquid level at the cold-critical volume of fuel, to the level at the hot-critical volume, shown as 126 in Fig. 1, the liquid forces vapor and gases present above the liquid upwardly through spaces in baffle 45 and around the edges of baffle 45 through which thimbles 49 pass, into the vapor region 20 above the baffle 45.

The circulating pump is then turned on and the water flow rate through the heat exchanger is increased until the desired power extraction rate is reached. The liquid fuel will be circulated up channel 121 around the heat exchanger 52 into the critical region and down channel 122. The specific reactor described, at the prescribed operating temperature, will develop about 2 megawatts of heat. The internal pressure will be less than about 5000 p.s.i.

Thus, it is apparent that the liquid fuels of the present invention result in the simplification of the reactor in which they are used by providing for the automatic recombination of the radiolytic gases formed from the dissociation of the water moderator. Furthermore, these liquid fuels are thermally and neutronically stable at high temperatures thereby facilitating the production of steam within the heat exchanging apparatus in the reactor vessel. These liquid fuels also provide a method for controlling the maximum operating temperature of the nuclear reactor whereby the maximum operating temperature can be built into the reactor by the proper selection of the liquid fuel used.

Although a particular reactor has been described using one of the liquid fuels of the present invention, it is apparent that other types of homogeneous reactors could use liquid fuels of the present invention. Therefore, the present invention is not limited to the specific reactor embodiment disclosed but is limited only by the appended claims.

What is claimed is:

1. A liquid fuel for a homogeneous nuclear reactor consisting essentially of a solution of uranyl phosphate, phosphoric acid and ordinary water, said uranium being enriched in the isotope $U^{235}$, said solution having a phosphoric acid concentration of from about 2 to about 8 molar, said $U^{235}$ having a concentration of at least about $10^{-2}$ molar.

2. A liquid fuel for a homogeneous nuclear reactor consisting essentially of a solution of uranous phosphate, phosphoric acid and ordinary water, said uranium being enriched in the isotope $U^{235}$, said solution having a phosphoric acid concentration of from about 8 to about 19 molar, said $U^{235}$ having a concentration of at least about $10^{-2}$ molar.

3. The method of achieving radiolytic stabilization in a homogeneous hydrogen moderated nuclear power reactor comprising the steps of providing a reactor vessel having a critical region and a vapor region above and in communication with the critical region, and creating a critical assembly within the reactor by adding a sufficient quantity of liquid fuel which at a predetermined reactor operating temperature will fill the critical region of the reactor, said fuel consisting essentially of a solution of uranyl phosphate, phosphoric acid and water, said phosphoric acid having a concentration of from about 2 molar to about 8 molar, said solution being enriched in a fissionable isotope selected from the class consisting of $U^{233}$ and $U^{235}$, said enrichment being sufficient to cause a condition of nuclear criticality when said fuel fills the critical region at said predetermined operating temperature, whereby the dissociation products of said fuel are automatically recombined in the fuel solution and in the vapor pressure region above the surface of said liquid fuel to maintain the total reactor pressure below a predetermined safe value.

References Cited in the file of this patent

UNITED STATES PATENTS

| | | |
|---|---|---|
| 2,770,520 | Long et al. | Nov. 13, 1956 |
| 2,806,763 | Fitch et al. | Sept. 17, 1957 |
| 2,820,753 | Miller et al. | Jan. 21, 1958 |

OTHER REFERENCES

U.S. Atomic Energy Commission LA-1942 by L. D. P. King (April 13, 1955), declassified August 17, 1955, pp. 1-15.

Proceedings of the International Conference on the Peaceful Uses of Atomic Energy. Held in Geneva Aug. 8-20, 1955. Vol. 3, "Power Reactors," United Nations, N.Y., pp. 263, 286.